US012148101B2

(12) United States Patent
Zavesky et al.

(10) Patent No.: US 12,148,101 B2
(45) Date of Patent: Nov. 19, 2024

(54) SYSTEMS AND METHODS FOR FACILITATING IMMERSIVE EXHIBITS

(71) Applicant: AT&T Intellectual Property I, L.P., Atlanta, GA (US)

(72) Inventors: Eric Zavesky, Austin, TX (US); Jean-Francois Paiement, Sausalito, CA (US); Wen-Ling Hsu, Bridgewater, NJ (US); Tan Xu, Bridgewater, NJ (US); Aritra Guha, Edison, NJ (US); Qiong Wu, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 200 days.

(21) Appl. No.: 17/976,447

(22) Filed: Oct. 28, 2022

(65) Prior Publication Data

US 2024/0144604 A1    May 2, 2024

(51) Int. Cl.
*G06T 19/00* (2011.01)
*H04W 4/021* (2018.01)

(52) U.S. Cl.
CPC .......... *G06T 19/003* (2013.01); *G06T 19/006* (2013.01); *H04W 4/021* (2013.01); *G06T 2200/24* (2013.01); *G06T 2219/024* (2013.01)

(58) Field of Classification Search
None
See application file for complete search history.

(56) References Cited

U.S. PATENT DOCUMENTS

| 10,339,718 | B1* | 7/2019 | Kamal | H04N 9/3194 |
| 2013/0249792 | A1* | 9/2013 | Carraro | G06T 19/003 |
| | | | | 345/156 |
| 2013/0249948 | A1* | 9/2013 | Reitan | G06T 19/00 |
| | | | | 345/633 |
| 2013/0326384 | A1* | 12/2013 | Moore | G01C 21/3664 |
| | | | | 715/771 |
| 2014/0063061 | A1* | 3/2014 | Reitan | G09G 5/14 |
| | | | | 345/633 |
| 2016/0012642 | A1* | 1/2016 | Lee | G06T 19/006 |
| | | | | 345/426 |
| 2017/0124763 | A1* | 5/2017 | De Pasquale | G09B 5/125 |

(Continued)

*Primary Examiner* — Martin Mushambo
(74) *Attorney, Agent, or Firm* — Guntin & Gust, PLC; Matthew Tropper

(57) ABSTRACT

Aspects of the subject disclosure may include, for example, capturing a first depiction of an exhibit environment, wherein the first depiction of the exhibit environment comprises an image of at least one artifact and an image of at least one interface element, and wherein the at least one interface element is located in the exhibit environment at a first location relative to the at least one artifact; obtaining a first user profile of a first user, wherein the first user profile comprises at least one first preference of the first user, and wherein the first user is located in a first remote environment; and facilitating a presenting of a first modified version of the first depiction of the exhibit environment in the first remote environment, wherein the first modified version moves the image of the at least one interface element to a second location relative to the at least one artifact, wherein the second location is different than the first location, and wherein the second location is selected based upon the first preference of the first user. Other embodiments are disclosed.

20 Claims, 10 Drawing Sheets

(56) References Cited

U.S. PATENT DOCUMENTS

| | | | | |
|---|---|---|---|---|
| 2017/0285738 A1* | 10/2017 | Khalid | .................... | G06T 15/20 |
| 2018/0341811 A1* | 11/2018 | Bendale | ................. | G06V 20/70 |
| 2019/0073831 A1* | 3/2019 | Kim | ........................ | G06F 3/011 |
| 2022/0277525 A1* | 9/2022 | Li | ........................ | G06V 20/635 |

* cited by examiner

SYSTEMS AND METHODS FOR FACILITATING IMMERSIVE EXHIBITS

FIELD OF THE DISCLOSURE

The subject disclosure relates to systems and methods for facilitating immersive exhibits.

BACKGROUND

There have been certain efforts to bring newer technologies to the museum experience. One example is Van Gogh "going immersive," allowing the experience to be differently interactive as compared to viewing paintings on a 2D canvas (see, e.g., https://vangoghexpo.com).

BRIEF DESCRIPTION OF THE DRAWINGS

Reference will now be made to the accompanying drawings, which are not necessarily drawn to scale, and wherein.

DETAILED DESCRIPTION

Figure 1:
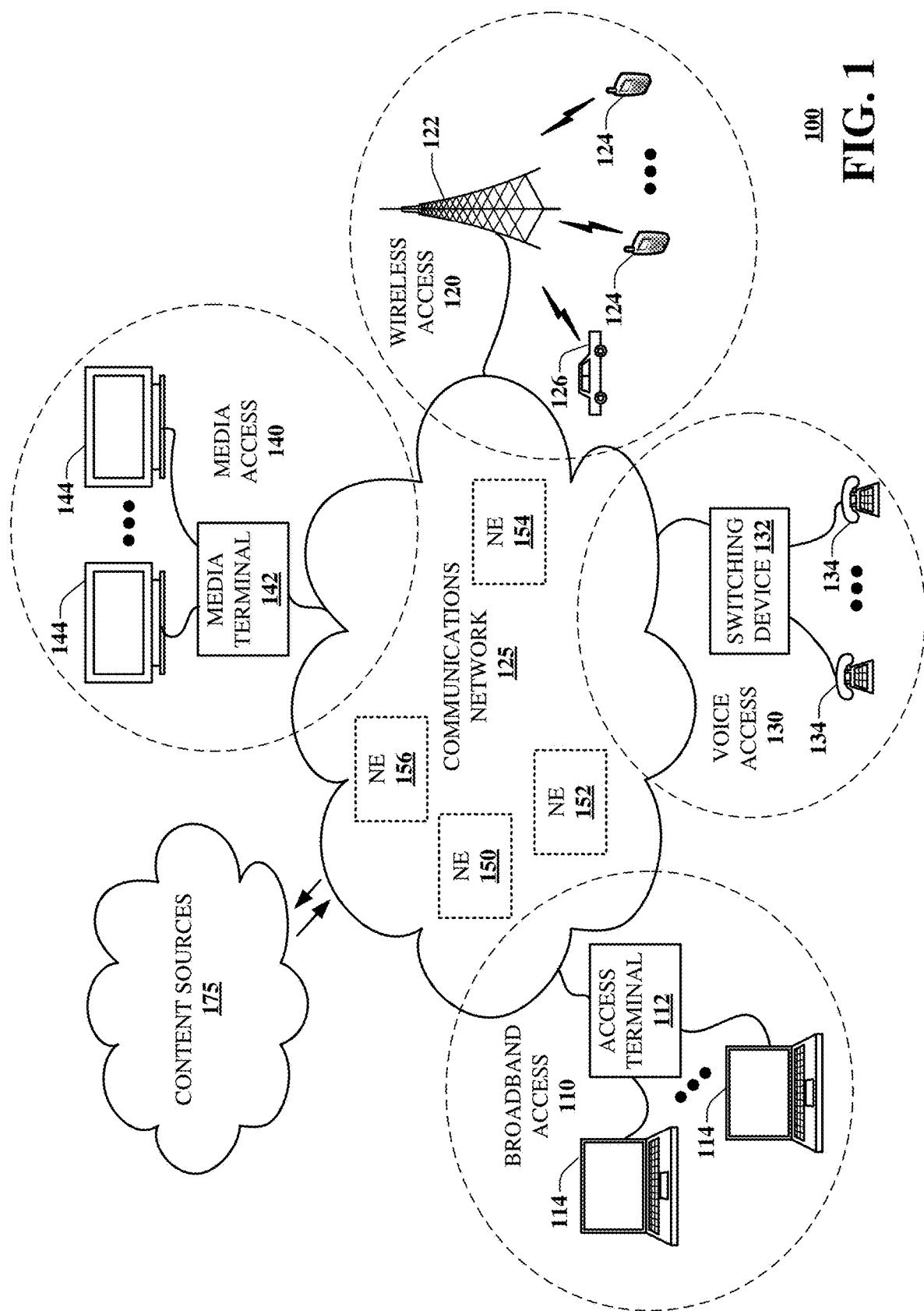
FIG. 1 is a block diagram illustrating an example, non-limiting embodiment of a communication network in accordance with various aspects described herein.

The subject disclosure describes, among other things, illustrative embodiments for facilitating immersive exhibits. Other embodiments are described in the subject disclosure.

One or more aspects of the subject disclosure include a mechanism that provides immersive enhancement of peoples' museum/exhibition experiences. Various embodiments provide for: (a) 3D capture and understanding of a target environment; (b) understanding of what objects in an artifact may be used for enhancement; (c) strategic playback and rendering with real-time user interaction; (d) interactive engagement with immersive environment and co-participants; or (e) any combination thereof.

One or more aspects of the subject disclosure include a mechanism that provides: (a) embedding of objects in virtual immersive space to facilitate experience scenarios in an off-site context (for example, coordinating museum visits for schools with large number of children); (b) playback of captured content to enable re-experiencing; (c) user/designer control to append/refine/filter out objects based on personal choice (e.g., for mimicking user-specific patterns, such as, color-blindness); (d) multiple-user interaction revolving around joint interactive experience; (e) modulation of the rendered/generated content to accommodate varying hardware and available resources (e.g. "focus" mode, "high compute" component); (f) interacting by artists with visitors immersed in experiencing the museum/exhibition; or (g) any combination thereof.

One or more aspects of the subject disclosure include a device comprising: a processing system including a processor; and a memory that stores executable instructions that, when executed by the processing system, facilitate performance of operations, the operations comprising: capturing a first depiction of an exhibit environment, wherein the first depiction of the exhibit environment comprises an image of at least one artifact and an image of at least one interface element, and wherein the at least one interface element is located in the exhibit environment at a first location relative to the at least one artifact; obtaining a first user profile of a first user, wherein the first user profile comprises at least one first preference of the first user, and wherein the first user is located in a first remote environment; and facilitating a presenting of a first modified version of the first depiction of the exhibit environment in the first remote environment, wherein the first modified version moves the image of the at least one interface element to a second location relative to the at least one artifact, wherein the second location is different than the first location, and wherein the second location is selected based upon the first preference of the first user.

One or more aspects of the subject disclosure include a non-transitory machine-readable medium comprising executable instructions that, when executed by a processing system including a processor, facilitate performance of operations, the operations comprising: capturing a first depiction of an exhibit environment, wherein the first depiction of the exhibit environment comprises an image of at least one artifact and an image of a plurality of interface elements; facilitating a first presenting of a first modified version of the first depiction of the exhibit environment in a first remote environment where a first user is located, wherein the first presenting is performed by first equipment in the first remote environment, and wherein the first modified version places an image of a first subset of the plurality of interface elements in the first remote environment; facilitating a second presenting of a second modified version of the first depiction of the exhibit environment in a second remote environment where a second user is located, wherein the second presenting is performed by second equipment in the second remote environment, wherein the second modified version places an image of a second subset of the plurality of interface elements in the second remote environment, and wherein the second subset is different from the first subset; receiving first feedback from the first equipment in the first remote environment, wherein the first feedback is indicative of a first virtual movement by the first user of the at least one interface element that is presented in the first remote environment; and receiving second feedback from the second equipment in the second remote environment, wherein the second feedback is indicative of a second virtual movement by the second user of the at least one interface element that is presented in the second remote environment.

One or more aspects of the subject disclosure include a method comprising: capturing, by a processing system including a processor, a first depiction of an exhibit environment, wherein the first depiction of the exhibit environment comprises an image of at least one artifact and an image of a plurality of physically present exhibit visitors; obtaining, by the processing system, a first profile of a first remote visitor who is located in a first remote environment, wherein the first profile comprises at least one first preference of the first remote visitor; and sending, by the processing system, to first user equipment located in the first remote environment first data that facilitates a first presentation of a first modified version of the first depiction of the exhibit environment in the first remote environment, wherein the first modified version depicts fewer physically present exhibit visitors than were physically present during the capturing, and wherein an amount of physically present exhibit visitors in the first modified version is selected based upon the first preference of the first remote visitor.

Referring now to FIG. 1, a block diagram is shown illustrating an example, non-limiting embodiment of a system 100 in accordance with various aspects described herein. For example, system 100 can facilitate in whole or in part presentation of immersive exhibits (including capturing image/video/audio depictions of one or more artifacts in an exhibit environment, personalizing the captured image/video/audio depictions for presentation to a first user in a first user environment, personalizing the image/video/audio depictions for presentation to a second (different) user in a second (different) user environment, presenting the personalized image/video/audio depictions to the first user in the first user environment, and presenting the personalized image/video/audio depictions to the second user in the second user environment). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
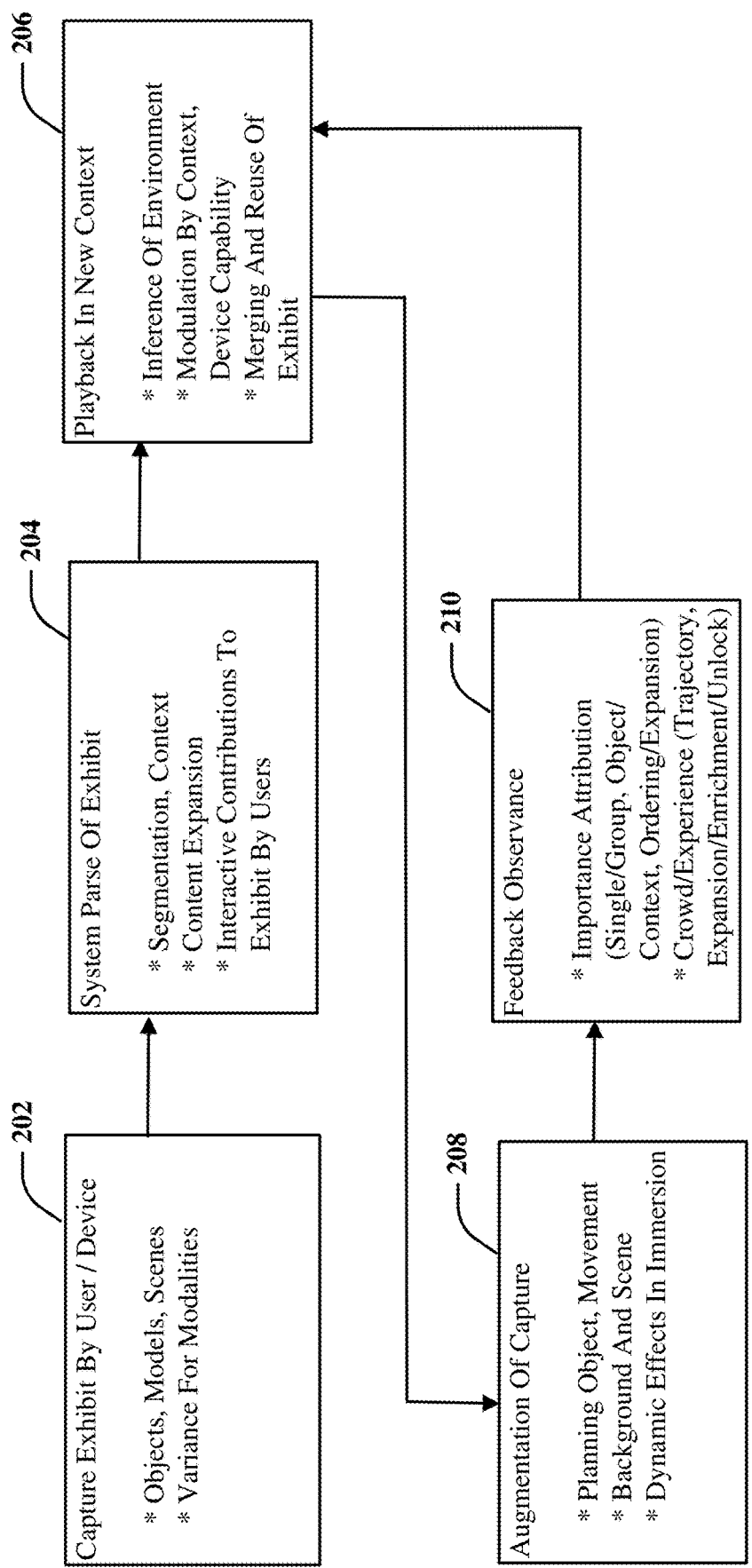
FIG. 2A is a block diagram illustrating an example, non-limiting embodiment of a system flow (which can function fully or partially within the communication network of FIG. 1) in accordance with various aspects described herein.

Referring now to FIG. 2A, this is a block diagram illustrating an example, non-limiting embodiment of a system flow 200 (which can function fully or partially within the communication network of FIG. 1) in accordance with various aspects described herein. As seen in this figure, a first step 202 can be Capture Exhibit by User/Device (this step can comprise the capture of objects, models, and/or scenes (including variance for modalities) that are central to the exhibit). Next, step 204 can be System Parse of Exhibit (this step can comprise: (a) segmentation of objects, context of the objects and scenes (such as sounds, smells, and lighting in and around the exhibit); (b) content expansion; and/or (c) interactive contributions to exhibit by users). Next, step 206 can be Playback in New Context (this step can comprise: (a) inference of environment; (b) modulation by context and/or device capability; and/or (c) merging and reuse of exhibit objects or new context-based objects). Next, step 208 can be Augmentation of Capture (this step can comprise: (a) planning of exhibit objects and movement associated with the exhibit; (b) background and scene augmentation of the new context with details from the original exhibit; and/or (c) dynamic effects in the exhibit immersion). Next. Step 210 can be Feedback Observance (this step can comprise: (a) importance attribution (single/group, object/ context, ordering/expansion) to objects in the exhibit; and/or (b) crowd/experience (trajectory, expansion/enrichment/unlock)) for interactions with various components of the exhibit. Further an output from step 210 can be fed back to step 206 in an iterative process.

Reference will now be made to certain additional details of system flow according to various embodiments. More particularly:

1. Content capture of an exhibit/location experience (see, e.g., step 202 of FIG. 2A)
   a) Optionally, it can include primary object (that is in focus/cut out) as well as background content
   b) Accommodates 3D, stitched, models, etc. content that may be assembled from multiple cameras, microphones, or alternate video capture devices
   c) Accommodating different capture types, system can infer missing information about the original exhibit
      1. A 2D camera can allow mapping for stand-in of similar objects, views, or other components of the exhibit
      2. Can allow multiple resolution of object capture
      3. Can allow capture of other content types like audio, smell, humidity, light, air flow, etc.
2. System understanding of capture (see, e.g., step 204 of FIG. 2A)
   a) Object segmentation and context understanding of the exhibit and the objects and scenes that compose it
   b) Understanding of current semantic/emotional response by observance of interactions with the components in the exhibit
   c) System can consult third-party oracle for content expansion to dereference a famous picture (e.g., a celebrity or iconic representation) or a specific object (e.g., a specific soup can or a generic car door)
   d) Facilitate user interactions with the exhibits, emulating activities that may be performed by in-person users
      1. User can "leave their mark" by manipulation of art in an immersive setting
      2. Subsequent visitors can "reset" and/or observe those modifications, if interactive some exhibits may convey an original versus modified state
      3. Optionally, the system can capture user can add restrictions for object placement (e.g., phone must be on desk or within five feet of it)
3. Playback at designated environment/context (see, e.g., step 206 of FIG. 2A)
   a) Inference of current environment via same capture method to span object, scene, and user interactions
   b) Inference and/or input of user context for the scene, environment, and social context of the new user
   c) Policies cane be provided from capture and/or playback (e.g., only use certain brand of avatar or visuals)
   d) Change the quality or capacity based on the playback equipment
   e) Have structured time sequencing (e.g., introduction of basic sculpture or early art then extension into subsequent work) that is detected from user history/exposure to early works
   f) Allow merging of exhibits and/or previously captured artifacts
      1. As an enhancement of the current experience
      2. By merging to show progression/evolution of the technique
4. System augmentation of the original capture (with environment) for new space (see, e.g., step 208 of FIG. 2A)
   a) Planning specific object insertion or movement of objects in scene that align to the original exhibit's structure and interactivity
   b) Planning of background population—either complementing playback context or matching capture context
      1. E.g., detect black/white space, correlate to strokes in content, much as modern digital displays accommodate a "dark" mode
   c) Determination of dynamic elements that were not a part of the capture like the social context or ambient level of sound in the room (air conditioning, traffic noises of a dense city)
5. During playback, observe user interactions for deeper immersion (see, e.g., step 210 of FIG. 2A)
   a) Observe user interaction value importance of modification
      1. Feedback (behavioral as well) can be attributed to individual experience and/or group experience
      2. Observations from engagement can prioritize or decrease importance of certain capture and/or playback components
      3. Can include guidance to other areas without manipulation
   b) System can help to manage "crowds" by observing trend in popularity and visits and permute the trajectory/views of individuals
      1. Optionally, can include richer or more primitive experience based on ordering of those visits
      2. For immersion, can create alternate virtual spaces where audio/visual changes based on prior experience but is "unlocked" by ordering.

Figure 2B:
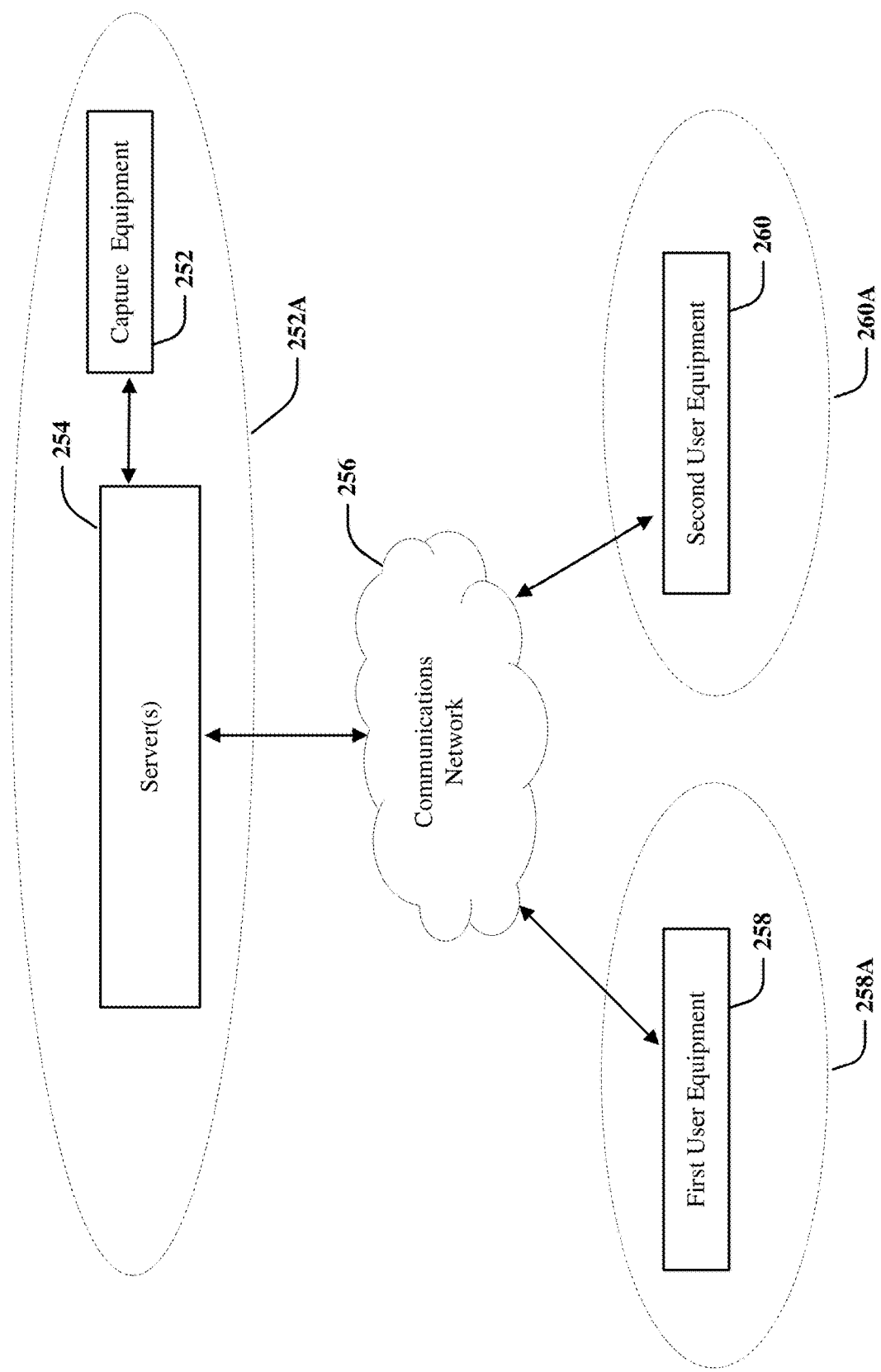
FIG. 2B is a block diagram illustrating an example, non-limiting embodiment of a system (which can function fully or partially within the communication network of FIG. 1) in accordance with various aspects described herein.

Referring now to FIG. 2B, this is a block diagram illustrating an example, non-limiting embodiment of a system 250 (which can function fully or partially within the communication network of FIG. 1) in accordance with various aspects described herein. As seen in this figure, capture equipment 252 is located in an exhibit environment 252A. The capture equipment can capture, for example, video/audio depictions of the exhibit environment 252A. The capture equipment 252 is in bi-directional communication with server(s) 254. In one embodiment the servers 254 are co-located with the capture equipment 252 in the exhibit environment 252A. In another embodiment the server(s) 254 are located elsewhere (that is not in the exhibit environment 252A).

Still referring to FIG. 2B, it is seen that server(s) 254 are in bi-directional communication (via communications network 256) with first user equipment 258 and second user equipment 260. In various embodiments the communications network 256 can comprise the Internet, an intranet, a wide area network (WAN), a local area network (LAN), a wireless network, a wired network, or any combination thereof. The first user equipment is located in the first remote environment 258A and the second user equipment is located in the second remote environment 260A. In various embodiments, the first user equipment 258 can comprise a first projector (or the like) for presenting depictions of the exhibit environment 252A (sent from the server(s) 254) to a first user in the first remote environment and the second user equipment 260 can comprise a second projector (or the like) for presenting depictions of the exhibit environment 252A (sent from the server(s) 254) to a second user in the second remote environment. In various embodiments, the first user equipment 258 can comprise a first user interface mechanism for receiving first user input from the first user in the first remote environment 258A and the second user equipment 260 can comprise a second user interface mechanism for receiving second user input from the second user in the second remote environment 260A. In various embodiments, the first user input can be sent back to the server(s) 254 and the second user input can be sent back to the server(s) 254. Based upon the first user input and/or the second user input that is sent back to server(s) 254, the server(s) 254 can then send to first user equipment 258 and/or second user equipment 260 modified depictions (for example, based upon the first user input and/or the second user input an artifact in the exhibit environment can be shown to the first user and/or the second user from different angles).

Figure 2C:
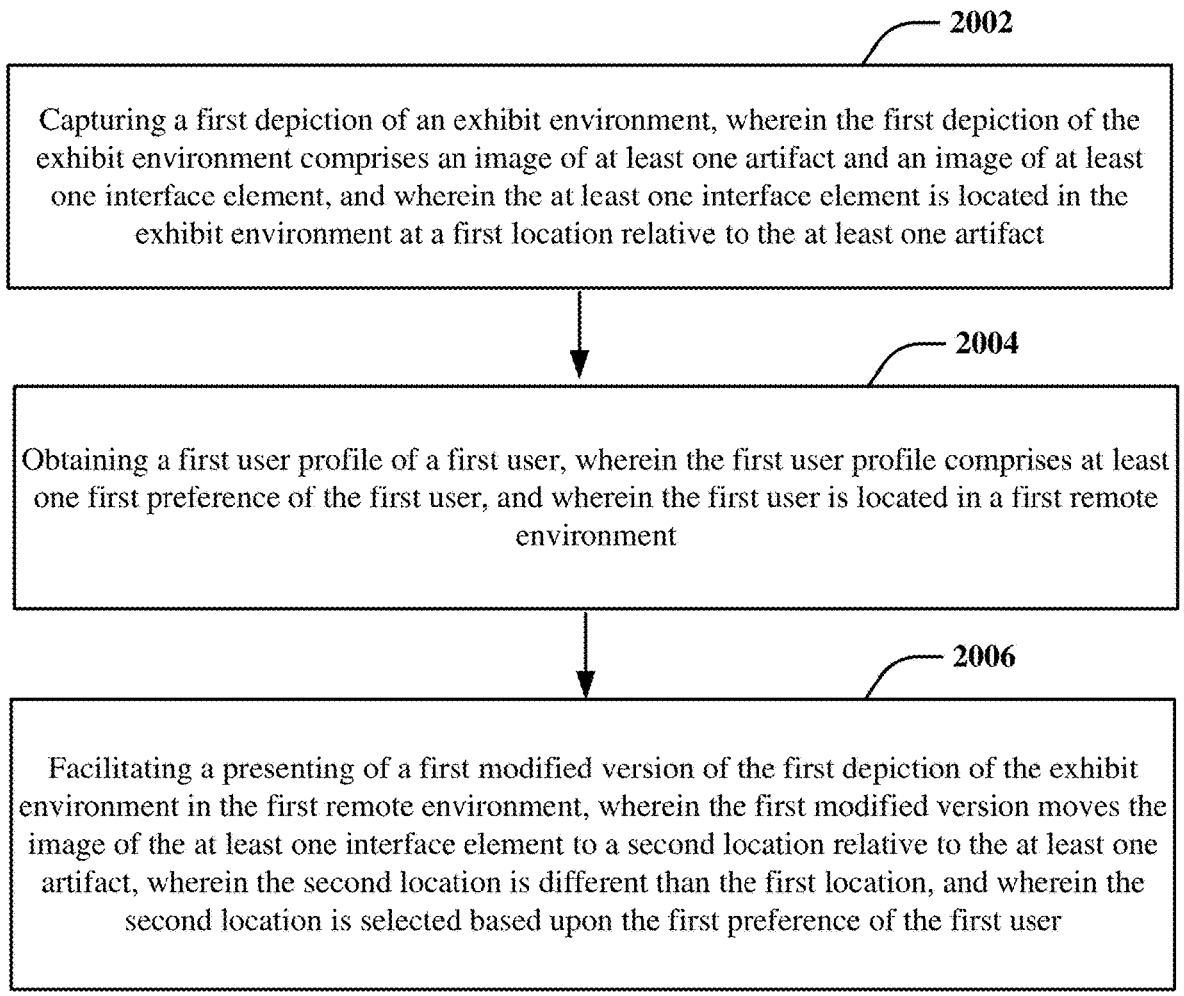
FIG. 2C depicts an illustrative embodiment of a method in accordance with various aspects described herein.

Referring now to FIG. 2C, various steps of a method 2000 according to an embodiment are shown. As seen in this FIG. 2C, step 2002 comprises capturing a first depiction of an exhibit environment, wherein the first depiction of the exhibit environment comprises an image of at least one artifact and an image of at least one interface element, and wherein the at least one interface element is located in the exhibit environment at a first location relative to the at least one artifact. Next, step 2004 comprises obtaining a first user profile of a first user, wherein the first user profile comprises at least one first preference of the first user, and wherein the first user is located in a first remote environment. Next, step 2006 comprises facilitating a presenting of a first modified version of the first depiction of the exhibit environment in the first remote environment, wherein the first modified version moves the image of the at least one interface element to a second location relative to the at least one artifact, wherein the second location is different than the first location, and wherein the second location is selected based upon the first preference of the first user.

In one embodiment, the user profile can be obtained from a database (which can contain one or more user profiles for each of one or more users).

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
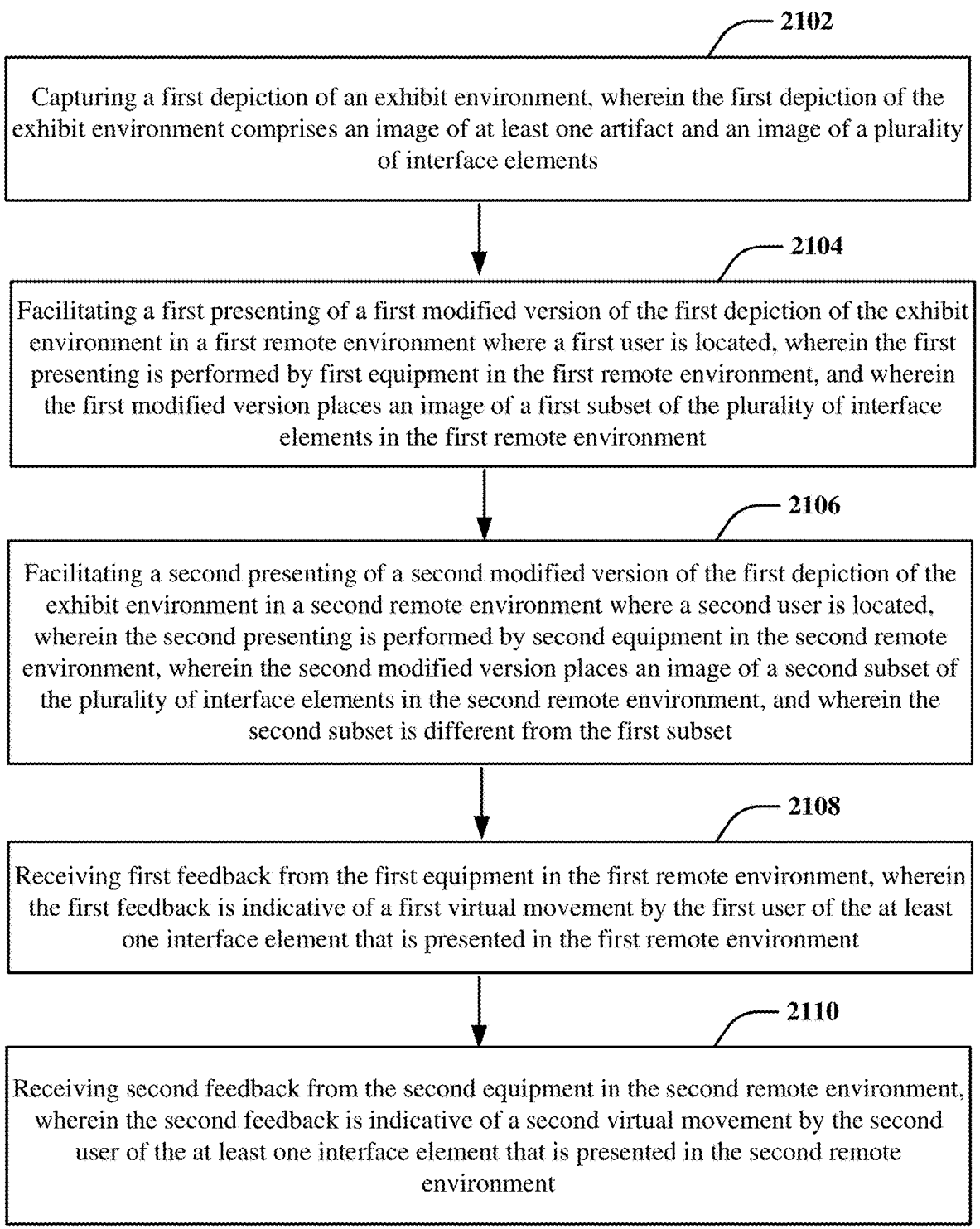
FIG. 2D depicts an illustrative embodiment of a method in accordance with various aspects described herein.

Referring now to FIG. 2D, various steps of a method 2100 according to an embodiment are shown. As seen in this FIG. 2D, step 2102 comprises capturing a first depiction of an exhibit environment, wherein the first depiction of the exhibit environment comprises an image of at least one artifact and an image of a plurality of interface elements. Next, step 2104 comprises facilitating a first presenting of a first modified version of the first depiction of the exhibit environment in a first remote environment where a first user is located, wherein the first presenting is performed by first equipment in the first remote environment, and wherein the first modified version places an image of a first subset of the plurality of interface elements in the first remote environment. Next, step 2106 comprises facilitating a second presenting of a second modified version of the first depiction of the exhibit environment in a second remote environment where a second user is located, wherein the second presenting is performed by second equipment in the second remote environment, wherein the second modified version places an image of a second subset of the plurality of interface elements in the second remote environment, and wherein the second subset is different from the first subset. Next, step 2108 comprises receiving first feedback from the first equipment in the first remote environment, wherein the first feedback is indicative of a first virtual movement by the first user of the at least one interface element that is presented in the first remote environment. Next, step 2110 comprises receiving second feedback from the second equipment in the second remote environment, wherein the second feedback is indicative of a second virtual movement by the second user of the at least one interface element that is presented in the second remote environment.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
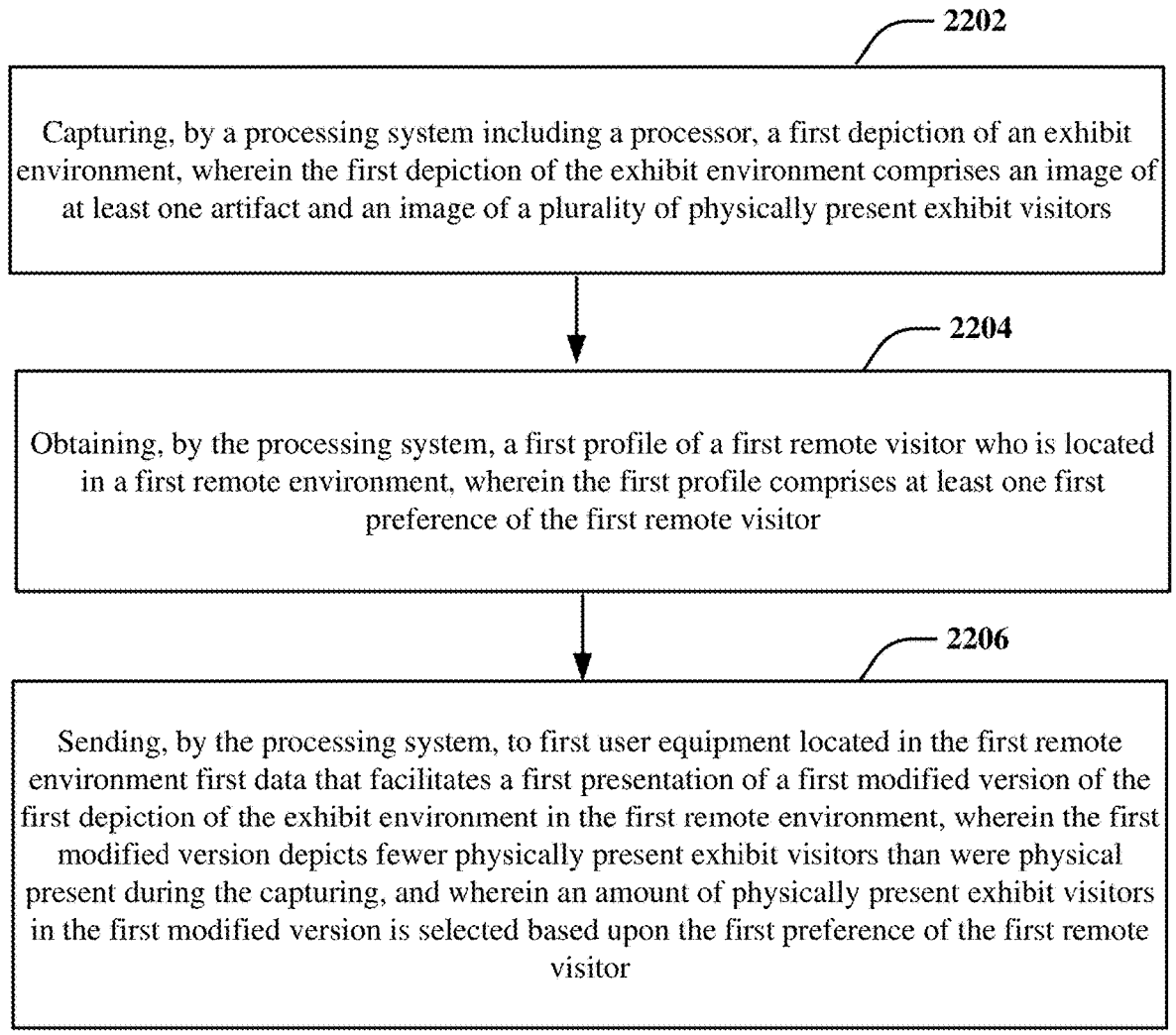
FIG. 2E depicts an illustrative embodiment of a method in accordance with various aspects described herein.

Referring now to FIG. 2E, various steps of a method 2200 according to an embodiment are shown. As seen in this FIG. 2E, step 2202 comprises capturing, by a processing system including a processor, a first depiction of an exhibit environment, wherein the first depiction of the exhibit environment comprises an image of at least one artifact and an image of a plurality of physically present exhibit visitors. Next, step 2204 comprises obtaining, by the processing system, a first profile of a first remote visitor who is located in a first remote environment, wherein the first profile comprises at least one first preference of the first remote visitor. Next, step 2206 comprises sending, by the processing system, to first user equipment located in the first remote environment first data that facilitates a first presentation of a first modified version of the first depiction of the exhibit environment in the first remote environment, wherein the first modified version depicts fewer physically present exhibit visitors than were physical present during the capturing, and wherein an amount of physically present exhibit visitors in the first modified version is selected based upon the first preference of the first remote visitor.

In one embodiment, the amount of physically present exhibit visitors in the first modified version can be zero.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments provide for immersive enhancement of peoples' museum/exhibition experiences. Such immersive enhancement can include one or more of:

3D capture and understanding of a target environment.
        Assistance in capturing the critical components of an exhibit or experience in a traditional museum or educational environment.
    Understanding of what objects in the exhibit may be used for enhancement.
        Automated and guided identification of the specific objects that are important for the immersion or exhibit.
        With context, adding adjustments (e.g., small objects, lighting, positional modifications) to better utilize the user's local scene.

Strategic playback and rendering with real-time user interaction.
> When rendering, use adjustments that are commensurate to the user's device capabilities (e.g., lower bandwidth, non-tactile, audio or video only, etc.).
> Can facilitate personalized experiences for each user that connect to their historical views, preferences, etc. (in addition to optimization for their traversal of the environment).

Interactive engagement with immersive environment and co-participants.
> Choice-enabled interaction as in real space for users of varying age/taste. (e.g., virtual buttons/levers that produce responses/provide information when engaged).
> Allowing conversation/interaction with other participants concurrently using the same immersive space.

As described herein, various embodiments provide for accommodating an immersion experience to incorporate subjectivity of choices and/or environment of the end user (e.g., consumer). In this regard, various embodiments can provide a subjective "enjoyable experience" that is influenced by the personal choices of the individual as well as by the interaction between the environment around the user and the environment created through the immersion.

As described herein, various embodiments provide for using immersion technology (e.g., augmented reality (AR) glasses, mobile phones, spatial audio, and/or projection) to enable enhancement in content consumption.

As described herein, various embodiments provide for systems/methods that can be utilized with static and/or virtual art exhibits.

As described herein, various embodiments provide for systems/methods to enable a user/designer to append/refine/filter out objects based on personal choice mimicking user-specific patterns, such as, color-blindness. This functionality can also provide for enablement of other senses such as sense/touch (especially for visually impaired users). This functionality can also enable personalization of the art style (e.g., Vincent Van Gogh style or Monet style) and/or enable prefetching of one or more objects.

As described herein, various embodiments provide for systems/methods to enable multiple-user interaction revolving around joint interactive experiences. This functionality can also enable conversations between users simultaneously in the immersive space. This functionality can also enable embedding of one or more co-users into the immersive space of other user(s).

As described herein, various embodiments provide a capture component along with a mechanism to enable a user to modify the captured content.

As described herein, various embodiments provide a mechanism to enable a user to modify the content according to user context and history of the user with the whole immersion being the guide (not just a content centerpiece).

As described herein, various embodiments provide a mechanism to play a preconstructed immersion in a new environment, wherein the content comprises captured art with social contributions enabled.

As described herein, various embodiments provide a mechanism to play a preconstructed immersion in a new environment, wherein active guidance is based on user preferences and history.

Reference will now be made to certain benefits according to various embodiments. More particularly, such benefits can include: (a) facilitating capture and creation of immersive versions of previously static physical art (can include, for example, ability for users to add their own interactive touch to the exhibits, which is typically not possible today); (b) eliminate (or reduce) time and location being a problem (for instance, various embodiments can facilitate immerse museums that make it possible to enjoy the artifacts from all over the world without time and location limitations); (c) facilitate immersions of a captured exhibit that are not static in their rendering—with automated adjustments that can be based on their rendering context (e.g. small apartment, audio-only, etc.) and that can be based on the user's engagement and history with similar exhibits); (d) helping people with special needs (for example, immerse museums according to various embodiments can make it more fulfilling, more fun, and less difficult to get knowledge for disabled people); (e) enable visitors to get more information when they interact with various objects; (f) any combination of the above.

Reference will now be made to certain features according to various embodiments. More particularly, such features can include: (a) extension of the capture and enhance scenario to bridge to a full sports-based interaction (for instance, to play tennis or running competition within a new space according to activity objectives (e.g., "virtual kung-fu"); (b) automated host/VA (virtual assistant) creation for annotation of experience (e.g., taking static visual and audio content and synthesizing through avatar for interaction); (c) connection and adaptation to psychological experiences (or certain same-state therapy) scenarios; (d) semi-automated chronological creation of "tour guide" that is either part of the original experience or curated from user's experience in similar scenarios (e.g. within a museum, time optimized for parts of painter background you didn't know; or "in the wild" touring a canyon, can direct user to specific visuals or physical spaces that may not be enjoyable for everyone); (e) expansion to other architectural artifacts (e.g. with cultural and/or structural significance, but not traditionally art pieces like paintings, sculptures, etc.); (f) facilitating an immersive experience (e.g. the content that is replayed later) that is an assembly of one or more captured experiences of others; (g) boost the experience for virtual courses (e.g., to interact with deep learning models to give the intuition for the neuros, forward propagation and backward propagation); (h) any combination of the above.

Reference will now be made to the following "Use Case Examples" according to various embodiments:
> Novel augmentation of traditional static, physical environments for virtual playback
>> You can capture the object to make it immersive (it can match objects)
>> You can playback the captured immersion in a new environment; can use mapping, object recognition, etc.
>> Can show where those components go
>> Can show more future opportunities
>> Can think of both an "immersive exhibit" and an "historical exhibit"
>> Watching a movie in a different environment
>> Such capture and playback can provide enhancement of the space on demand (e.g., given some initial assumptions)
> Adding information to enhance captured assets for in-person experience
>> Capture an asset (or load it historically), offer enhancements and additional immersive objects via processing to fill/enable the space that may be available for playback One specific example is categorical recognition of a space and generation of NPCs to interact in a room; can be based on preferences and/or contextual goals Projection to full immersion spaces using pro-cam system for full immersion with multi-screen and personal entertainment area Sharing educational content and training with others.

As described herein, various embodiments provide for a user to leave a mark socially.

As described herein, various embodiments provide for a moving/manipulated environment along with playback by engagement.

As described herein, various embodiments can automate the process of "going immersive" (for instance, using content generation, historical links, summaries).

As described herein, various embodiments can accommodate those that don't have the device (e.g., device loaners, projections from mounted camera/ceiling that operate within a limited cone (e.g., for those low-fi users)).

As described herein, various embodiments can implement a lower tier for a particular immersion (e.g., data limit, number of pixels, light) that throttles delivery.

As described herein, various embodiments can address a fairness issue for resource and platform usage. For example: (1) Use the remote server for most of the computation to build the virtual object and use website for rendering (see, e.g., webXR); and/or (2) Make prediction on user's preference and prefetch the immersive objects.

As described herein, various embodiments can consider other settings where you want to embed prior events and/or contexts (e.g., where I lived before).

As described herein, various embodiments can implement mapping and expansion by recognition (e.g., additional content building capability—even bringing in physical assets that are actionable in the immersion (for instance, bring in my computer to interact with)).

As described herein, various embodiments can implement a system that exists with an environment, but also changes to use ML to extract functionalities that go beyond 3D space (e.g., make every space a museum that overlays for your current location).

As described herein, various embodiments can utilize physical objects in real environment to link to specific other immersions included in an exhibit (e.g., consider one embodiment as a pop-up museum for the pre-defined immersive set but customize based on new environment).

As described herein, various embodiments can implement a science museum for kids to touch/interact with physical components and link virtual responses for engagement.

As described herein, various embodiments can provide for: (a) Measuring smell/taste and utilizing an "aroma/odor/smell" release box in sync with XR/VR/Entertainment; (b) In a manner similar to vision and hearing (which have established statistical methods for measurement/evaluation), same can be done with aroma using chemical molecules count releasing in air; taste can be done as well (with Covid symptoms, measurement can actually be useful as diagnostic tool).

As described herein, various embodiments can allow user to allow/reject new opportunity addition (similar to senses generation).

As described herein, various embodiments can be tied to other navigation and/or exploration systems.

As described herein, various embodiments can: (a) utilize dynamic content generation of new/abstract objects with GANs; (b) augment with prior information; and/or (c) apply movement and "living faces" technology (see, e.g., https://www.myheritage.com/deep-nostalgia).

As described herein, various embodiments can implement personally historical recreation (e.g., recreating the space, immersive data recreation in a space).

As described herein, various embodiments can implement functional additions (e.g., "read the room and apply genre and/or immersive content).

As described herein, various embodiments can limit and/or determine what to be created (e.g., see content locked at a specific location).

As described herein, various embodiments can provide both a creation and a playback side. For example: (a) you can capture the object to make it immersive (it can match objects); (b) you can playback the captured immersion in a new environment—uses mapping, object recognition, etc.; (c) can show where those components go; (d) can show more future opportunities; (e) can think of both "immersive exhibit" and a "historical exhibit" (both of these do enhancement of the space on demand (given some initial assumptions); (f) functional step description—determine the creation, decision points, content archive and fitting for the environment; and/or (g) implement user required interaction for functionality.

As described herein, various embodiments can provide digitization by segmenting.

As described herein, various embodiments can: (a) create more elements for function to go from the art to the final experience (e.g., black wall+white wall, do some synthesis); (b) add oasis to a desert, add style that aligns to background; and/or (c) incorporate other content that uses pro-camera system for full immersion.

As described herein, various embodiments can determine which object(s)/artifact(s) are important.

As described herein, various embodiments can capture an object and its spatial configuration.

As described herein, various embodiments can adjust an object to be presented into a user's space.

As described herein, various embodiments can combine user content with an immersive experience.

As described herein, various embodiments can utilize an environments sounds/smells.

As described herein, various embodiments can utilize profiles (e.g., a particular user wants certain sounds to be louder or softer, a particular user wants certain colors to be increased or decreased, a particular user wants to change intensity of movement, a particular user wants actors to be further away or closer).

As described herein, various embodiments can provide a user certain depictions based upon an amount of bandwidth that is available.

As described herein, various embodiments can capture depictions of an exhibit environment using dedicated equipment at the exhibit environment and/or using user equipment.

As described herein, various embodiments can facilitate content changes by a user.

As described herein, various embodiments can provide for personalization (e.g., image to tactile and/or audio).

As described herein, various embodiments can digitize an entire experience.

As described herein, various embodiments can capture an exhibit and add a narrator voice (e.g., pointing out where to look).

As described herein, various embodiments can capture moving objects in the form or a movie or the like.

As described herein, various embodiments can: determine whether a wall or floor element is important for a depiction; provide interactive TV (e.g., using moving objects in an immersion); capture in real-time; capture a user's environment; project an object into a user's space; add user content into an immersion; adjust objects (e.g., buttons, steps) for a person; distribute user interface elements among different users; implement smells in an environment; implement sounds in an environment; amplify sounds for a particular scene; implement spatial and content reconstruction; make sounds louder/softer; increase/decrease colors; increase/decrease movement intensity (e.g., reduce roller coaster hill intensity); increase/decrease space between actors; remove a crowd from a depiction; facilitate user augmentation of a capture; facilitate feedback (e.g., local live experience and/or feedback to playback engine (e.g., delete certain object based on communication channel)); implement volumetric video; digitize an entire museum experience; provide a narrator voice to a captured exhibit (e.g., based on where other people are looking, based on author commentary); and/or be used in an educational setting (e.g., bring museum to anyone anywhere).

Figure 3:
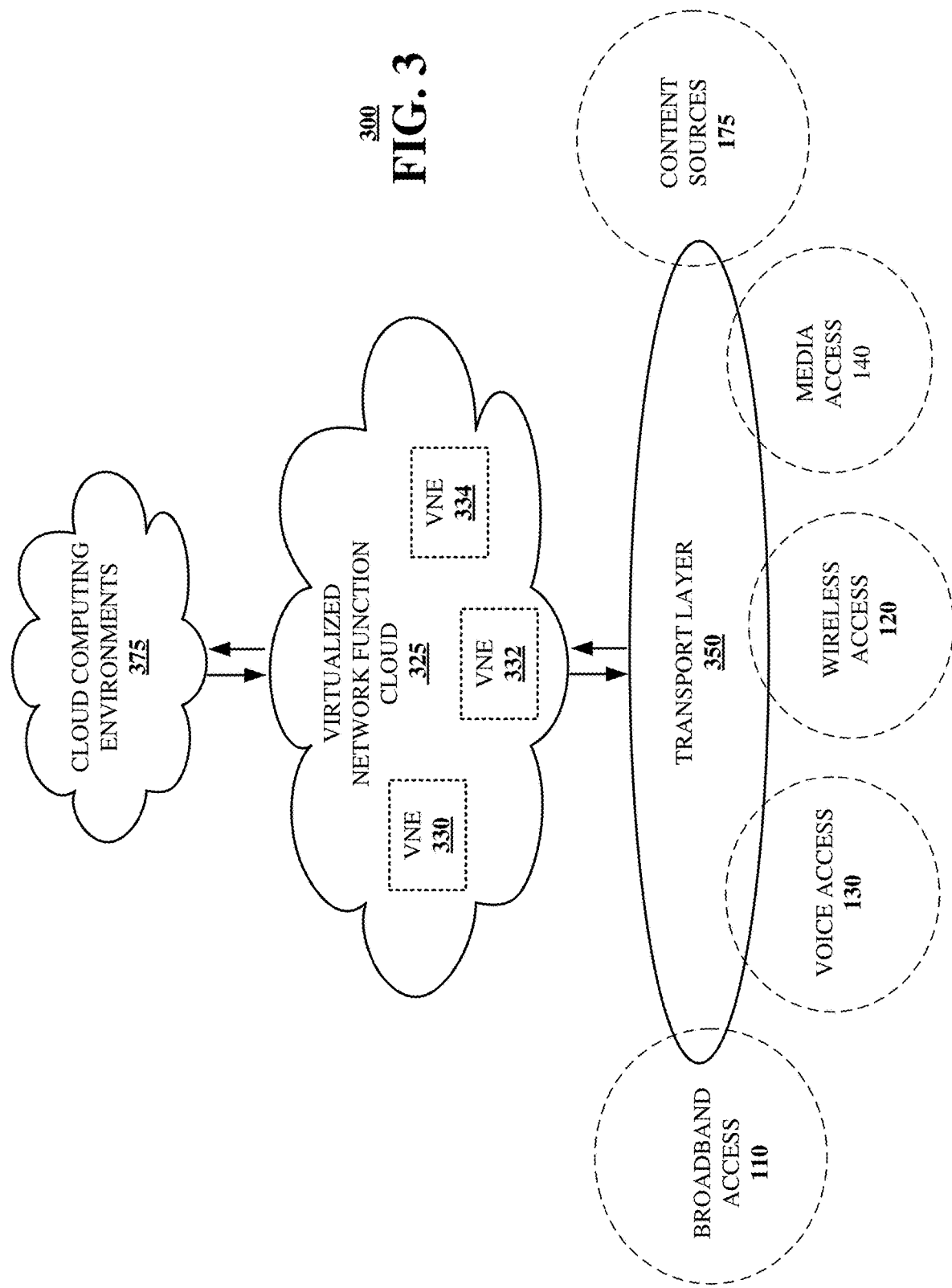
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of system 100, system 200, system 250, and/or some or all of the functions of methods 2000, 2100, 2200. For example, virtualized communication network 300 can facilitate in whole or in part presentation of immersive exhibits (including capturing image/video/audio depictions of one or more artifacts in an exhibit environment, personalizing the captured image/video/audio depictions for presentation to a first user in a first user environment, personalizing the image/video/audio depictions for presentation to a second (different) user in a second (different) user environment, presenting the personalized image/video/audio depictions to the first user in the first user environment, and presenting the personalized image/video/audio depictions to the second user in the second user environment).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
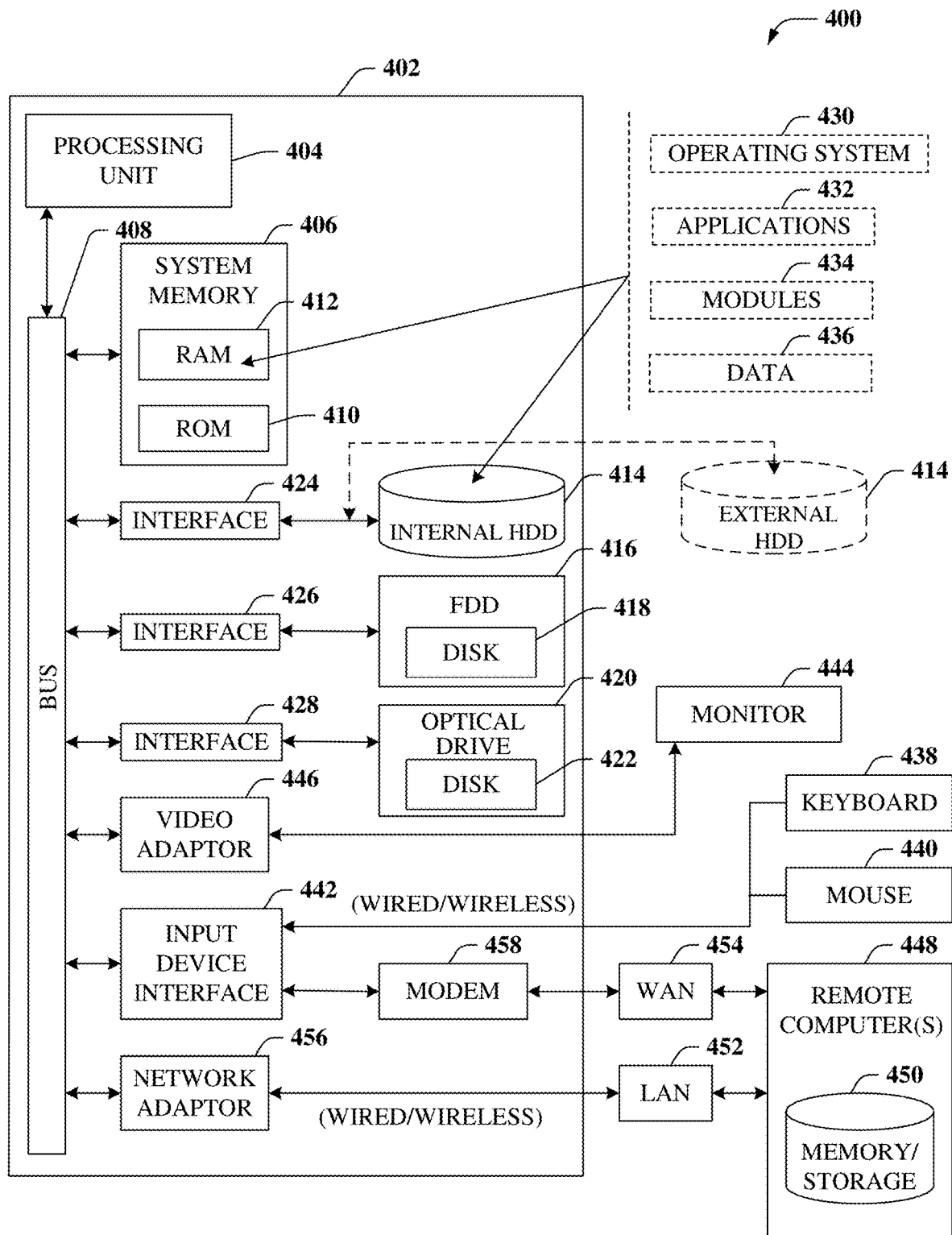
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part presentation of immersive exhibits (including capturing image/video/audio depictions of one or more artifacts in an exhibit environment, personalizing the captured image/video/audio depictions for presentation to a first user in a first user environment, personalizing the image/video/audio depictions for presentation to a second (different) user in a second (different) user environment, presenting the personalized image/video/audio depictions to the first user in the first user environment, and presenting the personalized image/video/audio depictions to the second user in the second user environment).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
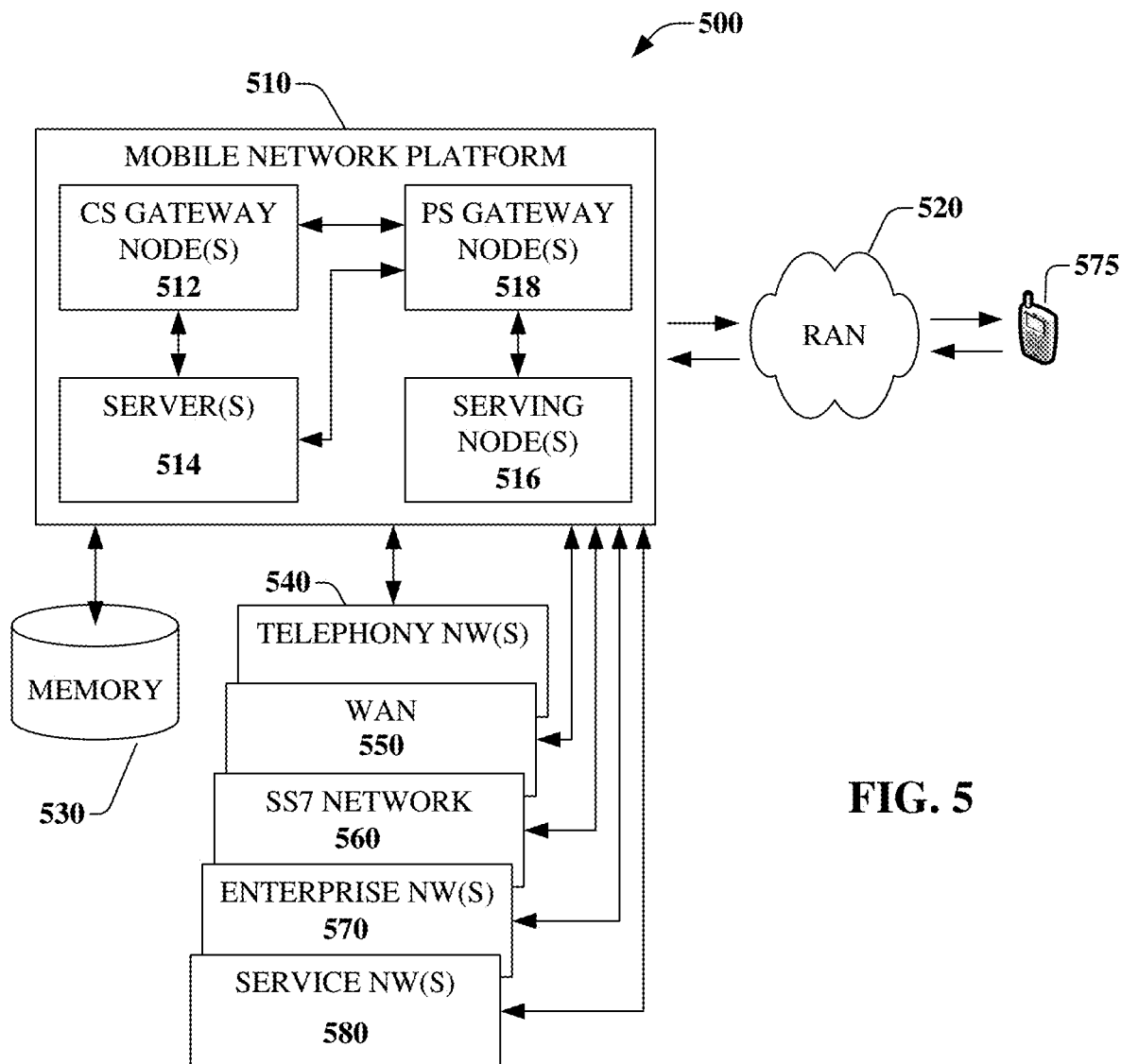
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part presentation of immersive exhibits (including capturing image/video/audio depictions of one or more artifacts in an exhibit environment, personalizing the captured image/video/audio depictions for presentation to a first user in a first user environment, personalizing the image/video/audio depictions for presentation to a second (different) user in a second (different) user environment, presenting the personalized image/video/audio depictions to the first user in the first user environment, and presenting the personalized image/video/audio depictions to the second user in the second user environment). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
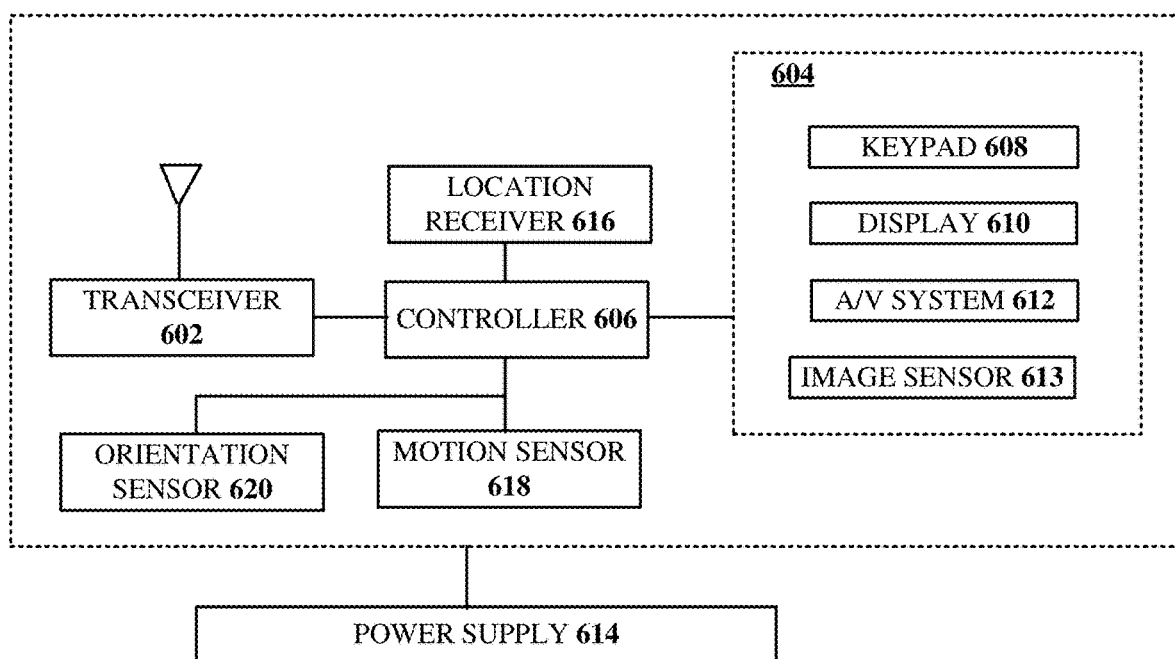
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part presentation of immersive exhibits (including capturing image/video/audio depictions of one or more artifacts in an exhibit environment, personalizing the captured image/video/audio depictions for presentation to a first user in a first user environment, personalizing the image/video/audio depictions for presentation to a second (different) user in a second (different) user environment, presenting the personalized image/video/audio depictions to the first user in the first user environment, and presenting the personalized image/video/audio depictions to the second user in the second user environment).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically presenting immersive exhibits (including automatically capturing image/video/audio depictions of one or more artifacts in an exhibit environment, automatically personalizing the captured image/video/audio depictions for presentation to a first user in a first user environment, automatically personalizing the image/video/audio depictions for presentation to a second (different) user in a second (different) user environment, automatically presenting the personalized image/video/audio depictions to the first user in the first user environment, and automatically presenting the personalized image/video/audio depictions to the second user in the second user environment)) can employ various AI-based schemes for carrying out various embodiments thereof. Moreover, the classifier can be employed to determine a ranking or priority of each user, each user environment, each artifact, and each exhibit environment. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the users, user environments, artifacts, and exhibit environments will receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, facilitate performance of operations, the operations comprising:
capturing a first depiction of an exhibit environment, wherein the first depiction of the exhibit environment comprises an image of at least one artifact and an image of at least one interface element, and wherein the at least one interface element is located in the exhibit environment at a first location relative to the at least one artifact;
obtaining a first user profile of a first user, wherein the first user profile comprises at least one first preference of the first user, and wherein the first user is located in a first remote environment; and
facilitating a presenting of a first modified version of the first depiction of the exhibit environment in the first remote environment, wherein the first modified version moves the image of the at least one interface element to a second location relative to the at least one artifact, wherein the second location is different than the first location, and wherein the second location is selected based upon the first preference of the first user.

2. The device of claim 1, wherein the at least one interface element comprises a plurality of interface elements.

3. The device of claim 2, wherein each of the plurality of interface elements comprises a button, a knob, a switch, a slider, or any combination thereof.

4. The device of claim 1, wherein the second location is above the first location or below the first location, to a left side of the first location or to a right side of the first location, or any combination thereof.

5. The device of claim 1, wherein the capturing comprises video capturing in the exhibit environment.

6. The device of claim 5, wherein:
the image of the at least one artifact comprises video of the at least one artifact; and
the image of at least one interface element comprises video of the at least one interface element.

7. The device of claim 5, wherein the capturing comprises capturing sound in the exhibit environment, capturing smell in the exhibit environment, or any combination thereof.

8. The device of claim 7, wherein the presenting comprises presenting video, presenting sound, presenting smell, or any combination thereof.

9. The device of claim 1, wherein the presenting the first modified version of the first depiction of the exhibit environment in the first remote environment is performed via projection of the first modified version into the first remote environment by projection equipment located in the first remote environment, via presentation by augmented reality (AR) equipment located in the first remote environment, or via any combination thereof.

10. The device of claim 1, wherein the facilitating the presenting the first modified version of the first depiction of the exhibit environment in the first remote environment comprises sending data indicative of the first modified version of the first depiction to user equipment in the first remote environment.

11. The device of claim 1, wherein the exhibit environment is in a museum, a gallery, an exhibit hall, or any combination thereof.

12. The device of claim 1, wherein the first remote environment is a room in a home, a room in an apartment, a room in a school, a room in an educational institution, or any combination thereof.

13. The device of claim 1, wherein:
the first modified version includes the image of the at least one artifact;
the at least one artifact comprises a plurality of artifacts; and
each of the plurality of artifacts comprises a painting, a picture, a sculpture, or any combination thereof.

14. The device of claim 1, wherein the operations further comprise:
obtaining a second user profile of a second user, wherein the second user profile comprises at least one second preference of the second user, wherein the second user is located in a second remote environment, and wherein the second remote environment is different from the first remote environment; and
facilitating a presenting of a second modified version of the first depiction of the exhibit environment in the second remote environment, wherein the second modified version moves the image of the at least one interface element to a third location relative to the at least one artifact, wherein the third location is different than the first location and the second location, and wherein the third location is selected based upon the second preference of the second user.

15. The device of claim 1, wherein the operations further comprise:
receiving feedback from user equipment in the first remote environment, wherein the feedback is indicative of virtual movement by the first user of the at least one interface element that is presented in the first remote environment.

16. The device of claim 15, wherein the operations further comprise:
responsive to the feedback that is received from the first user equipment, facilitating another presenting of a second modified version of the first depiction of the exhibit environment in the first remote environment, wherein the second modified version is in accordance with the feedback, and wherein the second modified version presents a different portion of the at least one artifact for viewing by the first user.

17. A non-transitory machine-readable medium comprising executable instructions that, when executed by a processing system including a processor, facilitate performance of operations, the operations comprising:
capturing a first depiction of an exhibit environment, wherein the first depiction of the exhibit environment comprises an image of at least one artifact and an image of a plurality of interface elements;
facilitating a first presenting of a first modified version of the first depiction of the exhibit environment in a first remote environment where a first user is located, wherein the first presenting is performed by first equipment in the first remote environment, and wherein the first modified version places an image of a first subset of the plurality of interface elements in the first remote environment;
facilitating a second presenting of a second modified version of the first depiction of the exhibit environment in a second remote environment where a second user is located, wherein the second presenting is performed by second equipment in the second remote environment, wherein the second modified version places an image of a second subset of the plurality of interface elements in the second remote environment, and wherein the second subset is different from the first subset;
receiving first feedback from the first equipment in the first remote environment, wherein the first feedback is indicative of a first virtual movement by the first user of the at least one interface element that is presented in the first remote environment; and
receiving second feedback from the second equipment in the second remote environment, wherein the second feedback is indicative of a second virtual movement by the second user of the at least one interface element that is presented in the second remote environment.

18. The non-transitory machine-readable medium of claim 17, wherein:
the first subset includes at least one first interface element that is not included in the second subset;
the second subset includes at least one second interface element that is not included in the first subset;
to virtually utilize all of the plurality of interface elements requires input by both the first user and the second user; and
the operations further comprise:
responsive to the first feedback and the second feedback, facilitating a third presenting of a third modified version of the first depiction of the exhibit environment in the first remote environment and in the second remote environment, wherein the third modified version presents a different portion of the at least one artifact for viewing by the first user and the second user.

19. A method comprising:
capturing, by a processing system including a processor, a first depiction of an exhibit environment, wherein the first depiction of the exhibit environment comprises an image of at least one artifact and an image of a plurality of physically present exhibit visitors;
obtaining, by the processing system, a first profile of a first remote visitor who is located in a first remote environment, wherein the first profile comprises at least one first preference of the first remote visitor; and
sending, by the processing system, to first user equipment located in the first remote environment first data that facilitates a first presentation of a first modified version of the first depiction of the exhibit environment in the first remote environment, wherein the first modified version depicts fewer physically present exhibit visitors than were physical present during the capturing, and wherein an amount of physically present exhibit visitors in the first modified version is selected based upon the first preference of the first remote visitor.

20. The method of claim 19, further comprising:
obtaining, by the processing system, a second profile of a second remote visitor who is located in a second remote environment, wherein the second profile comprises at least one second preference of the second remote visitor; and
sending, by the processing system, to second user equipment located in the second remote environment second data that facilitates a second presentation of a second modified version of the first depiction of the exhibit environment in the second remote environment, wherein the second modified version depicts fewer physically present exhibit visitors than were physical present during the capturing, wherein the second modified version depicts fewer physically present exhibit visitors than are depicted in the first modified version, and wherein another amount of physically present exhibit visitors in the second modified version is selected based upon the second preference of the second remote visitor.

* * * * *